(12) United States Patent
Tsou et al.

(10) Patent No.: US 8,709,315 B2
(45) Date of Patent: Apr. 29, 2014

(54) PROCESS FOR MAKING THERMOPLASTIC POLYMER PELLETS

(75) Inventors: Andy Haishung Tsou, Allentown, PA (US); Mohsen Shahmirzadie Yeganeh, Hillsborough, NJ (US); Gregory K. Hall, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 531 days.

(21) Appl. No.: 12/583,318

(22) Filed: Aug. 18, 2009

(65) Prior Publication Data

US 2011/0042380 A1 Feb. 24, 2011

(51) Int. Cl.
*B29B 9/00* (2006.01)
*B29B 9/06* (2006.01)
*B29C 47/88* (2006.01)
*B28B 7/36* (2006.01)

(52) U.S. Cl.
USPC ........... 264/142; 264/141; 264/143; 264/148; 264/178 R; 264/211; 264/211.12; 264/338; 425/67; 425/68; 425/69; 425/71; 425/311; 425/313; 425/315; 427/135

(58) Field of Classification Search
None
See application file for complete search history.

(56) References Cited

U.S. PATENT DOCUMENTS

| | | | |
|---|---|---|---|
| 2,403,476 A * | 7/1946 | Berry et al. ............ | 425/464 |
| 3,361,679 A | 1/1968 | Paulus | |
| 3,436,449 A * | 4/1969 | Treu al. ................ | 264/142 |
| 3,942,937 A * | 3/1976 | Prober et al. ............ | 425/461 |
| 4,117,645 A * | 10/1978 | Phillips ................ | 53/431 |
| 4,117,646 A | 10/1978 | Phillips | |
| 4,457,686 A * | 7/1984 | Rowland ............... | 425/463 |
| 4,622,193 A * | 11/1986 | Kresge et al. ........... | 264/141 |
| 4,954,352 A | 9/1990 | Luker | |
| 4,968,468 A * | 11/1990 | Leinweber ............. | 264/113 |
| 5,041,251 A * | 8/1991 | McCoskey et al. ...... | 264/130 |
| 5,460,760 A * | 10/1995 | Tsai et al. .............. | 264/39 |
| 5,593,956 A | 1/1997 | Gzesh | |
| 6,080,346 A * | 6/2000 | Jack .................... | 264/143 |
| 6,228,902 B1 | 5/2001 | Brueggeman et al. | |
| 6,331,360 B1 * | 12/2001 | Sugimoto et al. ....... | 428/523 |
| 6,372,848 B1 | 4/2002 | Yang et al. | |
| 7,163,989 B2 | 1/2007 | Friedersdorf | |
| 7,241,689 B2 | 7/2007 | Kim et al. | |
| 7,534,492 B2 | 5/2009 | Chen et al. | |
| 2002/0053752 A1 * | 5/2002 | Takei et al. ........... | 264/142 |
| 2002/0185768 A1 * | 12/2002 | Maletzko et al. ....... | 264/51 |
| 2004/0130054 A1 * | 7/2004 | Riffer ................. | 264/148 |
| 2004/0249046 A1 * | 12/2004 | Abhari et al. .......... | 524/474 |
| 2005/0155690 A1 | 7/2005 | Park | |
| 2006/0170137 A1 * | 8/2006 | Yeh et al. ............. | 264/349 |
| 2006/0183861 A1 * | 8/2006 | Harrington et al. ...... | 525/191 |
| 2006/0210666 A1 * | 9/2006 | Ouriev ................ | 425/376.1 |
| 2007/0246867 A1 | 10/2007 | Nelson et al. | |
| 2008/0022930 A1 | 1/2008 | Pekurovsky et al. | |
| 2009/0048571 A1 * | 2/2009 | Catalan et al. .......... | 604/367 |
| 2009/0273112 A1 * | 11/2009 | Boothe et al. .......... | 264/148 |

FOREIGN PATENT DOCUMENTS

| | | | |
|---|---|---|---|
| CN | 201136281 | | 10/2008 |
| JP | 50023462 | | 3/1975 |
| JP | 11034142 | | 2/1990 |
| JP | 05220812 | * | 8/1993 |
| JP | 11-348091 | | 12/1999 |
| KR | 10-2008-0037452 | | 4/2008 |
| WO | WO 99/07788 | | 2/1999 |
| WO | WO 01/46277 | | 6/2001 |

OTHER PUBLICATIONS

Xing, K.C. and H.P. Schrieber, "Effects of Fluoroplymers on LLDPE Processing: Some Quantitative Aspects", SPE Annual Technical Conference, Society of Plastics Engineers (1995), 53rd (vol. 1), 167-170.

* cited by examiner

*Primary Examiner* — Jeffrey Wollschlager

(57) ABSTRACT

Provided is a process for making thermoplastic polymer pellets. The process has the following steps: (a) melting a thermoplastic polymer to form a polymer melt; (b) extruding the melt through a die to form a substantially continuous molten polymer extrudate wherein the die has a contact surface bearing a polymer coating having a surface energy of less than 25 mN/m at 20° C.; (c) cooling the extrudate to form a cooled extrudate; and (d) pelletizing the cooled extrudate to form a plurality of polymer pellets. Provided is also a polymer pellet shipping system and a stable thermoplastic polymer pellet.

20 Claims, 1 Drawing Sheet

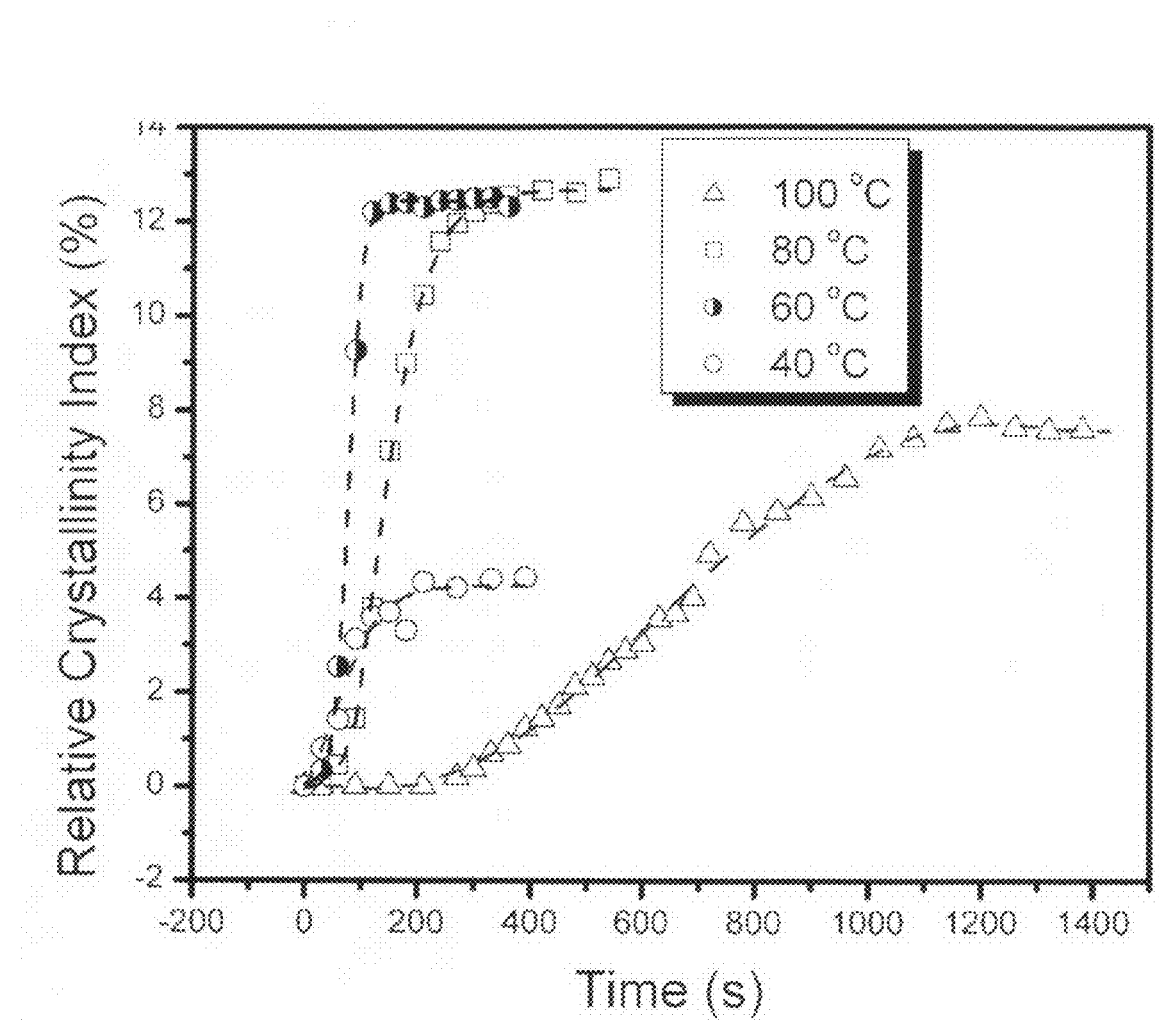

PROCESS FOR MAKING THERMOPLASTIC POLYMER PELLETS

FIELD

The present disclosure relates to a process for making thermoplastic polymer pellets. The present disclosure relates to a shipping system for thermoplastic polymer pellets. The present disclosure further relates to a stable thermoplastic pellet.

BACKGROUND

Thermoplastic polymers are produced, stored, and shipped as free-flowing pellets for the subsequent extrusion and fabrication by end users. A problem encountered with storage and shipping of pellets is sticking and agglomeration, which makes processing and handling of pellets difficult. Agglomeration is particularly observed when handling pellets of thermoplastic elastomers and adhesive polymers.

Metallocene-polymerized propylene-ethylene copolymers elastomers (with majority propylene) exhibit low crystallinity, typically less than 40 J/g of propylene crystallinity. Low crystallinity promotes elasticity but renders elastomers soft, typically with a Shore A hardness of less than 100. Soft pellets have tendency to agglomerate, which prevents free flow. One method for addressing softness of elastomer pellets is to incorporate into the elastomer matrix one or more polypropylene homopolymers or copolymers that exhibit high crystallinity, i.e., greater than 40 J/g. However, such modification of the elastomer compromises elasticity, extensibility, and softness.

Polyolefin-based adhesives can be derived from propylene copolymers, primarily propylene-hexene and propylene-ethylene copolymers, with the addition of tackifiers and stabilizers. Typically, such adhesives exhibit low propylene crystallinity, i.e., less than 40 J/g, and low stiffness, i.e., a Shore A hardness of less than 100. Low crystallinity is important for desirable levels of adhesion. Presently, anti-block agents are dusted onto adhesive pellets to prevent sticking and agglomeration during storage and shipping. However, anti-block agents, which exhibit high surface activity, negatively impact levels of adhesion and tackiness observed in the adhesives.

It would be desirable to have a process for making pellets of thermoplastic polymers that exhibit low levels of sticking or agglomeration during storage and shipping. It would also be desirable to have a system for shipping pellets that was substantially free of agglomeration. It would further be desirable to have thermoplastic pellets that exhibit low levels of sticking and agglomeration during storage and shipping.

SUMMARY

According to the present disclosure, there is provided a process for making thermoplastic polymer pellets. The process has the following steps: (a) melting a thermoplastic polymer to form a polymer melt; (b) extruding the melt through a die to form a substantially continuous molten polymer extrudate wherein the die has a contact surface bearing a polymer coating having a surface energy of less than 25 mN/m at 20° C.; (c) cooling the extrudate to form a cooled extrudate; and (d) pelletizing the cooled extrudate to form a plurality of polymer pellets.

Further according to the present disclosure, there is provided a polymer pellet shipping system. The system has a shipping container and a plurality of pellets of a thermoplastic polymer situated within the shipping container. The pellets exhibit a crystallinity of less than 40 J/g and a Shore A hardness of less than 100. The pellets remain substantially free of agglomeration for at least six months from the time of packing, i.e., from the time the pellets are inserted into the shipping container.

Further yet according to the present disclosure, there is provided a stable thermoplastic polymer pellet. The thermoplastic polymer exhibits at a surface thereof a crystallinity of about 15 J/g or more and a Shore A hardness of about 50 or more. Beneath the surface, the polymer matrix in the pellet optionally exhibits a lower level of crystallinity and a lower level of hardness. A pellet is stable if a plurality of them remain substantially free of agglomeration for at least six months from a time of packing, i.e., from a time the pellets are inserted into a shipping container.

BRIEF DESCRIPTION OF THE FIGURE

The FIGURE is a plot of crystallization index as a function of time and temperature for pellets produced by the process of the present disclosure.

DETAILED DESCRIPTION

The process of the present disclosure affords production of stable extruded thermoplastic pellets without substantial compromise of desirable physical property and/or performance attributes, such as elasticity and/or adhesion. The process produces extruded pellets having low surface energy surfaces that substantially reduce or prevent the likelihood of agglomeration during shipping and storage.

The process of the present disclosure has the following steps: (a) melting a thermoplastic polymer to form a polymer melt; (b) extruding the melt through a die to form a substantially continuous molten polymer extrudate wherein the die has a contact surface bearing a polymer coating having a surface energy of less than 25 mN/m at 20° C.; (c) cooling the molten extrudate to form a cooled extrudate; and (d) pelletizing the cooled extrudate to form a plurality of polymer pellets.

The thermoplastic polymer can be melted and extruded in any type of extruder known in the art, such as a single screw extruder, a twin-screw extruder, and a ram extruder. Extruders may also be used in series with mixers, if desired. Additives may also be added to the polymer matrix by addition to the extruder and/or mixer.

The die preferably takes the form of a multi-orifice die, such as a "spaghetti" die, through which strands of extrudate are conveyed. The shape of the orifices may take any known shape, such as circular, oval, and square. Circular dies are preferred since they form an extrudate, and, ultimately, pellets that are substantially cylindrical in configuration. A cylindrical configuration reduces the likelihood of pellet agglomeration.

The average size or diameter of the pellets is not critical and will typically vary from about 0.05 mm to about 20 mm.

The die orifices have a contact surface bearing a polymer coating having a low surface energy of less than 25 mN/m at 20° C. and preferably less than 21 mN/m at 20° C. Contact with the surface during extrusion imparts a similar surface energy to the extrudate passing through it, and, ultimately, the product pellets. The low surface energy of the pellet surfaces reduces the likelihood of agglomeration.

The polymer coating of the contact surfaces of the die orifices preferably takes the form of a fluoropolymer or a silicone polymer.

Fluoropolymers are useful as materials for low surface energy coatings. Examples of useful fluoropolymers include semicrystalline fluoropolymer and composites thereof. Fluoropolymers include polytetrafluoroethylene (PTFE), polyperfluoroalkoxy-tetrafluoroethylene (PFA), polyfluorinated ethylene-propylene (FEP), poly(ethylenetetrafluoroethylene), polyvinyl fluoride, polyvinylidene fluoride, poly(ethylene-chloro-trifluoroethylene), polychlorotrifluoroethylene and combinations thereof. Some of these fluoropolymers are commercially available as Teflon™ and Silverstone™ materials.

Preferred fluoropolymers include polyperfluoroalkoxy-tetrafluoroethylene (PFA), commercially available from DuPont under the trade name Teflon™ 855P322-32, Teflon™ 855P322-53, Teflon™ 855P322-55, Teflon™ 855P322-57, Teflon™ 855P322-58 and Teflon™ 857-210. Teflon™ 855P322-53; Teflon™ 855P322-57, and Teflon™ 855P322-58. These resins are particularly preferred because of their durability, abrasion resistance, and ability to form a very smooth layer. Polyperfluoroalkoxy-tetrafluoroethylene (PFA) may further have filler particles such as silicone carbide, aluminum silicate, carbon black, zinc oxide, tin oxide etc.

Suitable fluorocarbon thermoplastic random copolymers include vinylidene fluoride-co-tetrafluoroethylene co-hexafluoropropylenes, which can be represented as -(VF)(75)-(TFE) (10) -(HFP)(25)- (THV Fluoroplastics of Hoechst). In another embodiment, a vinylidene fluoride-co-tetrafluoroethylene-co-hexafluoropropylene can be represented as -(VF)(42)-(TFE) (10) -(HFP)(58)-(3M THV or THV-200 of 3M Inc.). Other suitable fluoropolymers, including uncured vinylidene fluoride-cohexafluoropropylenes and vinylidene fluoride-co-tetrafluoroethylene-co-hexafluoropropylenes, are available, for example, as THV-400, THV-500 and THV-300. THV fluoroplastics afford a combination of high flexibility and low process temperature. THV fluoroplastics typically afford flexural modulus values between about 83 Mpa and about 207 Mpa.

The molecular weight of the fluoropolymer is not critical provided it is not excessively large or small. In a preferred embodiment, the fluoropolymer has a number average molecular weight in the range of about 100,000 to about 200,000.

Additional teachings to useful fluoropolymers is seen in U.S. Pat. No. 7,534,492 B2, which is incorporated herein by reference in its entirety.

Silicone polymers may also be employed as coatings on the surfaces of the die. Exemplary hard and soft silicones are commercially available or can be prepared by conventional methods. Examples of commercially available silicones include DC6-2230 silicone and DC-806A silicone (sold by Dow Corning Corp.), which are hard silicone polymers, and SFR-100 silicone (sold by General Electric Co.) and EC-4952 silicone (sold by Emerson Cummings Co.), which are soft silicone polymers. DC6-2230 silicone is characterized as a silanol-terminated polymethyl-phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC-806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR-100 silicone is characterized as a silanol- or trimethylsilyl-terminated polymethylsiloxane and is a liquid blend comprising about 60 to 80 weight percent of a difunctional polydimethylsiloxane having a number-average molecular weight of about 90,000 and 20 to 40 weight percent of a polymethylsilyl silicate resin having monofunctional (i.e. $SiO_2$) repeating units in an average ratio of between about 0.8 and 1 to 1, and having a number-average molecular weight of about 2,500. EC-4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000.

Fluoroelastomer-silicone interpenetration networks can also be used as the surface coating materials. Preferred fluoroelastomer-silicone interpenetrating networks have ratios of silicone to fluoroelastomer polymer between about 0.1 and 1 to 1 by weight, preferably between about 0.2 and 0.7 to 1. The interpenetrating network is preferably obtained by mechanically compounding, for example, on a two-roll mill a mixture comprising from about 40 to 70 weight percent of a fluoroelastomer polymer, from 10 to 30 weight percent of a curable polyfunctional poly($C_{1-6}$alkyl)phenylsiloxane or poly($C_{1-6}$alkyl)siloxane polymer, from 1 to 10 weight percent of a curing agent, from 1 to 3 weight percent of a curing accelerator, from 5 to 30 weight percent of an acid acceptor type filler, and from 0 to 30 weight percent of an inert filler.

When a fluoroelastomer-silicone interpenetrating network is the fluoroelastomer layer material, the support is coated by conventional techniques, usually by compression molding or solvent coating. The solvents used for solvent coating include polar solvents, for example, ketones, acetates and the like. Preferred solvents for the fluoroelastomer based interpenetrating networks are the ketones, especially methyl ethyl ketone and methyl isobutyl ketone. The dispersions of the interpenetrating networks in the coating solvent are at concentrations usually between about 10 to 50 weight percent solids, preferably between about 20 to 30 weight percent solids. The dispersions are coated on the support to give a 10 to 100 micrometer thick sheet when cured.

Curing of the interpenetrating network is carried out according to the well known conditions for curing fluoroelastomer polymers ranging, for example, from about 12 to 48 hours at temperatures of between 50° C. to 250° C. Preferably, the coated composition is dried until solvent free at room temperature, then gradually heated to about 230° C. over 24 hours, then maintained at that temperature for 24 hours.

The molten extrudate is cooled by extrusion into a water bath and pelletized. The water bath is maintained at a temperature substantially lower than that of the molten extrudate. The temperature of the water bath preferably substantially corresponds to the maximum crystallization temperature of the thermoplastic polymer. It is desirable to maximize the level of crystallinity at the surfaces of the pellets to render the surfaces less tacky such that the likelihood of agglomeration is reduced. A preferred water bath temperature is typically about 40° C. to about 90° C.

Preferably, the water bath is maintained at a relatively low surface tension by introduction of one or more surfactants. Surfactants promote the migration of low surface energy hydrocarbons toward pellet surfaces enhancing surface crystallization and helping to reduce the likelihood of agglomeration. Examples of useful surfactants include ethylene glycol trisiloxane, polyoxyethylene glycol monoalkyl ether with dodecanol, phospate based alkyl polyethylene oxide surfactants, Dynol-607 (Air Products), and Carbowet-106 (Air Products).

The cooled extrudate may be pelletized to form pellets according to any methods known in the art. The pelletizer will typically take the form of a cutting device, such as a flying wheel. Preferably, pelletization takes place within the water bath. Underwater pelletization is disclosed, for example, in U.S. Pat. No. 7,163,989 B2. The pellets can then be dried by any method known in the art, such as a cyclone drier or heater.

The process of the present disclosure is useful with any thermoplastic polymer. Suitable polymers include homopolymers and copolymers of monoethylenically unsaturated monomers. Suitable monomers include alkenyl aromatics, olefins, amides, and polyacrylates. Suitable alkenyl aromatic polymers include polystyrene and polyalphamethylstyrene. Suitable polyolefins include polyethylene and polypropylene. Preferred polymers are copolymers of alphaolefins, such as ethylene, propylene, butene, pentene, hexene, heptene and octene. Copolymers employing alphaolefins of higher carbon number are also possible.

Preferred polymers include propylene-based copolymer elastomers, such as those disclosed in PCT Published Application No. WO2000001745A1 and WO1999007788A1, which are incorporated herein by reference. Propylene-olefin (PO) elastomers can be characterized based on relationship of mole percent olefin to 1) isotactic index, 2) percent meso propylene triad, and 3) glass transition temperature. The isotactic index of the copolymers is equal to $-0.0224O+A$, wherein O is the mole percent olefin present, A is a number from 66 to 89, and the isotactic index is greater than 0. The propylene tacticity of the copolymers can also be described by percent meso triad equal to $-0.4492O+B$, wherein O is the mole percent olefin present, B is a number from 93 to 100, and the % meso triad is less than 95%. Additionally, the copolymers can have a glass transition temperature equal to $-1.1082O-C$, wherein O is the mole % olefin present and C is a number from 1 to 14.

Other suitable polymers include propylene-based adhesives. Adhesives can take the form of a semi-crystalline copolymer of propylene and at least one comonomer selected from the group consisting of ethylene and at least one $C_4$ to $C_{20}$ α-olefin. The copolymer will preferably have a weight average molecular weight ($M_w$) from about 15,000 to about 200,000; a melt index (MI) from about 7 dg/min to about 3000 dg/min as measured by ASTM D 1238(B); and a ($M_w/M_n$) of approximately 2. The copolymer can also have a melt flow rate (MFR) equal to and above 250 dg/min at 230° C. The copolymer can be manufactured via a free radical initiator, e.g., a peroxide. Useful propylene-based adhesives are disclosed in PCT Published Application No. WO2001046277A2, which in incorporated herein by reference in its entirety. A particularly useful adhesive is the Linxar POA adhesive by ExxonMobil Chemical Company.

Antioxidants may optionally be added to the thermoplastic matrix to prevent oxidative degradation of the pellets. Suitable antioxidants include hindered phenols such as 2,6-di-t-butyl-4-methylphenol; 1,3,5-trimethyl-2,4,6-tris(3',5-di-t-butyl-4'-hydroxybenzyl)-benzene; tetrakis [(methylene(3,5-di-t-butyl-4-hydroxyhydrocinnamate)]methane (IRGANOX T11 1010 of Ciba Geigy); and octadecyl-3,5-di-t-butyl-4-hydroxy cinnamate (IRGANOXTII 1076 of Ciba Geigy). When present, the antioxidant is used at a preferred level of about 0.05 to about 2 parts by weight per 100 parts by weight of composition. Antioxidants and other additives, such as plasticizing oils and UV stabilizers, are well known and described in the literature, such as in PCT Published Application No. 2001046277A2; U.S. Pat. Nos. 5,143,968; and 5,656,698, all of which are incorporated herein by reference in their entirety.

Tackifiers may optionally be added to the matrix of the pellet to enhance adhesion thereof. Useful tackifiers include hydrocarbon resins, synthetic polyterpenes, rosin, rosin esters, and natural terpenes. Tackifiers may take the form of a solid, a semi-solid, or a liquid at ambient temperature. Preferred tackifiers are aliphatic hydrocarbon resins such as (1) resins resulting from the polymerization of monomers consisting of olefins and diolefins (e.g., Escorez 8 13 1 OLC and Escorez 2596 of ExxonMobil Chemical Co.) and the hydrogenated version thereof; (2) alicyclic petroleum hydrocarbon resins and the hydrogenated derivatives (e.g., Escorez 5300 and 5400 series from ExxonMobil Chemical and Eastotace resins of Eastman Chemical); (3) polyterpene resins and hydrogenated derivatives; (4) hydrogenated $C_9$ (e.g., Arkons P Series from Arakawa Chemical and Regalrezo and Regalite E from Hercules). Tackifiers may also be modified with aromatic components, such as Escorez 2596 of ExxonMobil Chemical Co. Other useful tackifiers are described in U.S. Pat. No. 5,143,968, which is incorporated herein by reference. Adhesive pellets typically contain from about 2 wt % to about 50 wt % of one or more tackifiers.

Anti-block agents may optionally be added to the surfaces of the pellets, i.e., admixed with a plurality of finished pellets, for the purpose of further diminishing the likelihood of agglomeration. Useful anti-block agents include, but are not limited to, primary amides, secondary amides, ethylene bisamides, waxes, talc and silica. Primary amides include, for example, stearamide, arachidamide, behenamide, oleamide and erucamide. Secondary amides include, for example, stearyl erucamide, erucyl erucamide, oleyl palmitamide, oleyl oleamide, stearyl stearamide and erucyl stearamide, and ethylenebisamides. Ethylenebisamides include, for example, ethylene biserucamide, ethylene bisstearamide, and ethylene bisoleamide. Waxes include, for example, paraffinic, isoparaffinic, and Fischer-Tropsch waxes. Anti-block agents are disclosed in U.S. Pat. No. 6,228,902B1, which is incorporated herein by reference.

Highly crystalline polymers may optionally be blended into the matrix of the pellets for the purpose of further diminishing the likelihood of agglomeration. Typically, such highly crystalline polymers exhibit a crystallinity of >40 J/g. Useful highly crystalline polymers include polypropylene, polyethylene, propylene-alpha olefin copolymers, ethylene-alpha olefin copolymers, and poly(4-methyl-1-pentene).

Shore A hardness is measured according to ASTM D2240.

Another aspect of the present disclosure is a polymer pellet shipping system. The system has a shipping container and a plurality of pellets of a thermoplastic polymer situated within the shipping container. The shipping container may take any form known in the art, such as a box, a bag or sack, a bag in a box, a crate, a trailer, a metal tank, a train car, or the like. During shipping and storage, it is desirable for the plurality of pellets in the shipping container to remain substantially free of agglomeration. For instance, in a preferred embodiment, a shipping container retaining 25,000 pellets or more would remain substantially free of agglomeration. Preferably, the pellets remain substantially free of agglomeration for at least six months from the time of packing, i.e., from the time the pellets are inserted into the shipping container. More preferably, the pellets remain substantially free of agglomeration for at least one year from the time of packing.

Another embodiment of the present disclosure is a stable thermoplastic polymer pellet. The thermoplastic polymer exhibits at a surface thereof a crystallinity of about 15 J/g or more and a Shore A hardness of about 50 or more. The polymer matrix within the pellet optionally exhibits a lower level of crystallinity and a lower level of hardness than the surface thereof. A pellet is stable if a plurality of them remain substantially free of agglomeration for at least six months from a time of packing, i.e., from a time the pellets are inserted into a shipping container.

It is envisioned that the thermoplastic pellets disclosed herein will be useful in any known end use for thermoplastic polymers. Typically, such pellets are melted and fabricated to a particular form. For instance, pellets can be melted to form a melt that can be extruded, coextruded, molded, laminated, pressed, pultruded, calendered, or the like. Useful molding techniques include compression molding and injection molding. Pellets can be fabricated to any known form, such as a film, sheet, foam, or article.

The following are examples of the present disclosure and are not to be construed as limiting.

EXAMPLES

Pellets were produced via extrusion processes. Pellets not exhibiting stability, i.e., those susceptible to sticking and agglomeration, as produced were subsequently melted and brought into contact with a coated surface of a surface energy of less than 25 mN/m at 20° C. to impart stability to pellet surfaces. The contact with the coated surface of low surface energy was deemed to effectively simulate extrusion through a die having a coated surface of low surface energy.

Feed copolymers and additives were introduced into a co-rotating twin screw extruder and melt extruded at a temperature of 210° C. through a uncoated multi-orifice die to form an extrudate. The extrudate was cooled in a water bath and cut with a flying wheel to form a plurality of discrete pellets, which were dried in a cyclone drier and tested.

The susceptibility of thermoplastic pellets to agglomeration during storage and shipping was simulated by a simple press-and-release test. Pellets were pressed together by hand for 1 minute and an attempt was made to try to separate them. Tackiness was rated on a scale of 1 to 6 based on the difficulty in separating the pellets. "1" means that there was no tack and "6" means that they could not be separated easily. Typically, pellets with a rating of 1 or 2 appear to be stable in production.

The impact of extrusion through a die having a coating of low surface energy was estimated by compression molding pellets at 200° C. between Teflon™ plates. After cooling, the resulting compression-molded sheet was cut into strips and manually pelletized. Tackiness of the resulting pellets was measured using the simple pressing and release method. Compositions 1 to 4

Pellets were prepared with four compositions of propylene-hexene copolymers and additives listed in Table 1. Tackifiers added were a maleated polypropylene (AC-596 by Honeywell) and a hydrocarbon (Escorez 5637 by ExxonMobil Chemical). Irganox 1010 was added as a stabilizer (antioxidant). The copolymers, tackifiers, and the stabilizer were extrusion blended. An anti-block agent, Hydrocer 145 by Shamrock Technologies was added to the water bath to prevent pellet sticking and agglomeration.

TABLE 1

| Composition | hexene (%) | AC-596 | Escorez | Hydrocer | Shore A | Tm (° C.) |
|---|---|---|---|---|---|---|
| 1 | 5.7 | 2% | 8% | <0.1% | 90 | 123 |
| 2 | 5.7 | 4% | 12% | <0.1% | 65 | 112 |
| 3 | 5.7 | 4% | 12% | <0.1% | 50 | 107 |
| 4 | 5.7 | 4% | 12% | <0.1% | 56 | 105 |

The stability of pellets, i.e., susceptibility to sticking and agglomeration, was determined by optical microscopy observation of the surface skin thickness and surface crystallinity measurement by a Sum Frequency Generator (SFR) using 2908 cm$^{-1}$ CH$_2$ Fermi resonance as the crystallinity measure. As shown in Table 2, that the pellet having thick crystalline skin and high surface crystallinity is pellet stable.

TABLE 2

| Composition | Pellet Stability | Skin Thickness (microns) | Surface crystallinity |
|---|---|---|---|
| 1 | Stable | 135 | High |
| 2 | Semi-stable | 70 | Some |
| 3 | Agglomerated | 0 | None |
| 4 | Severe agglomeration | 0 | None |

Compositions 3 and 4 were melted and brought into contact with an OTS (octadecyl-trichlorosilane) surface (24 mN/m surface tension) and with a polytetrafluororethylene (Teflon™ of the E.I. du Pont de Nemours & Company) surface (18 mN/m surface tension). The compositions were allowed to cool against the two surfaces. Afterward, their skin crystallinity values were measured using SFR. As shown in Table 3, surface crystallinity values of Compositions 3 and 4 could be raised to approximately those values of Compositions 1 and 2 by contacting them against low surface tension surfaces to promote polyolefin skin migration and surface crystallization. The detection limit of the SFR sets the definition of "some" crystallinity to be greater than 5 J/g.

TABLE 3

| Composition | Surface Crystallinity As-is | Against OTS Surface Crystallinity | Against Teflon ™ Surface Crystallinity |
|---|---|---|---|
| 3 | None | High | High |
| 4 | None | Not available | Some |

Example 2

Pellets produced from six propylene-hexene copolymers were examined for stability. As shown in Table 4, the copolymers have varying tackiness and stability values. The six pellets were pressed against a Teflon™ surface at 180° C. (above their melting temperatures) and dried in room air afterward. The tackiness of the contact surfaces of the copolymer compositions disappeared after their melt contact against a Teflon™ surface. All of the compositions became substantially equally non-tacky.

TABLE 4

| Example | Wt % hexene | Viscosity at 190° C. (cps) | Stability Rank* | After Teflon ™ contact: Stability Rank |
|---|---|---|---|---|
| 5 | 25 | 5675 | 1 | 1 |
| 6 | 20 | 4715 | 2 | 1 |
| 7 | 12 | 2600 | 3 | 1 |
| 8 | 9 | 3400 | 4 | 1 |
| 9 | 15 | 2117 | 5 | 1 |
| 10 | 10 | 1940 | 6 | 1 |

Example 3

Crystallization rates of Examples 1-4 were measured using x-ray scattering. As shown in the FIGURE for Example 1, crystallization rates at 40° C., 60° C., 80° C., and 100° C. for Example 1 were determined. Similarly, the crystallization rates at 40° C., 60° C., 80° C., and 100° C. for Examples 2-4 were also measured and have the same curve shapes as those shown in the FIGURE for Example 1. A maximum crystallization rate obtained for all four Examples was at 60° C.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances which fall within the scope of the appended claims.

What is claimed is:

1. A process for making thermoplastic propylene-based polymer pellets, comprising:
   (a) forming a polymer melt that consists of a propylene-based thermoplastic polymer having a Shore A hardness of less than 100 and a crystallinity of less than 40 J/g;
   (b) extruding the melt through a die to form a substantially continuous molten polymer extrudate, wherein the die has a contact surface bearing a polymer coating having a surface energy of less than 25 mN/m at 20° C.;
   (c) cooling the extrudate to form a cooled extrudate; and
   (d) pelletizing the cooled extrudate to form a plurality of polymer pellets, wherein the pelletizing takes place within a water bath, where the water bath temperature is in the range of about 40° C. to about 90° C. and where the water bath comprises a surfactant,
   wherein the surface of the polymer pellets have a crystallinity of about 15 J/g or more and a Shore A hardness of about 50 or more.

2. The process of claim 1, further comprising:
   (e) boxing the plurality of pellets by inserting them into a box; and
   (f) shipping the box to a location different than the location of the making the pellets.

3. The process of claim 2, further comprising applying an anti-block agent to surfaces of the pellets prior to boxing them.

4. The process of claim 1, wherein the melt is extruded through a multi-orifice die.

5. The process of claim 1, wherein the contact surface bears a coating selected from the group consisting of a fluoropolymer, a silicone polymer, and a fluoroelastomer-silicone interpenetrating network.

6. The process of claim 5, wherein the coating is a polytetrafluoroethylene.

7. The process of claim 5, wherein the coating is a polydimethylpolysiloxane.

8. The process of claim 1, wherein the thermoplastic polymer is melted and extruded in an extruder.

9. The process of claim 1, wherein the thermoplastic polymer is an elastomer.

10. The process of claim 1, wherein the thermoplastic polymer is an adhesive.

11. The process of claim 1, wherein the pellets have a Shore A hardness of less than 100.

12. The process of claim 1, wherein the pellets have an average diameter of from about 0.05 mm to about 20 mm.

13. The process of claim 1, wherein the pellets exhibit a crystallinity of less than 40 J/g and a Shore A hardness of less than 100, and wherein the pellets remain substantially free of agglomeration for at least six months.

14. The process of claim 1, wherein the thermoplastic polymer is a metallocene-polymerized propylene-ethylene copolymer.

15. The process of claim 1, wherein the thermoplastic polymer is a propylene-hexene copolymer or a propylene-ethylene copolymer.

16. The process of claim 2, wherein the box is a shipping container.

17. The process of claim 16, wherein the box includes a bag disposed therein, and wherein the plurality of pellets are situated within the bag.

18. The process of claim 1, wherein the pellets remain substantially free of agglomeration for at least one year.

19. The process of claim 1, wherein the surfactant comprises at least one of ethylene glycol trisiloxane, polyoxyethylene glycol monoalkyl ether with dodecanol, or phosphate based alkyl polyethylene oxides.

20. The process of claim 1, wherein the propylene-based thermoplastic polymer comprises propylene-derived units and olefin-derived units and wherein the polymer has a glass transition temperature in degrees Celsius equal to $-1.1082O-C$, wherein O is the mole % olefin-derived units present and C is a number from 1 to 14.

* * * * *